United States Patent
Siepker et al.

(10) Patent No.: US 12,377,821 B2
(45) Date of Patent: Aug. 5, 2025

(54) TRANSMISSION FOR A DRIVE TRAIN IN AN AGRICULTURAL OR HEAVY LOAD VEHICLE AND A CORRESPONDING DRIVE TRAIN AND CORRESPONDING VEHICLE

(71) Applicant: Rögelberg Holding Gmbh & Co. KG, Mennen (DE)

(72) Inventors: Hermann Siepker, Salzbergen (DE); Felix Kalverkamp, Rieste (DE)

(73) Assignee: Rögelberg Holding GmbH & Co. KG, Mennen (DE)

( * ) Notice: Subject to any disclaimer, the term of this patent is extended or adjusted under 35 U.S.C. 154(b) by 0 days.

(21) Appl. No.: 18/155,231

(22) Filed: Jan. 17, 2023

(65) Prior Publication Data
US 2023/0227009 A1      Jul. 20, 2023

(30) Foreign Application Priority Data
Jan. 14, 2022  (DE) .......................... 202022100214.2

(51) Int. Cl.
*F16H 3/62*     (2006.01)
*B60T 1/06*     (2006.01)
(Continued)

(52) U.S. Cl.
CPC .............. *B60T 1/062* (2013.01); *F16H 1/28* (2013.01); *F16H 3/62* (2013.01); *F16H 57/02* (2013.01); *F16H 63/345* (2013.01); *F16H 63/3483* (2013.01); *F16H 2057/02034* (2013.01); *F16H 2057/02056* (2013.01);
(Continued)

(58) Field of Classification Search
CPC .. F16D 55/40–55/44; F16D 65/84–853; F16H 2200/2007; F16H 2200/0034; F16H 3/52–62; F16H 3/64; F16H 2200/2097; F16H 2200/2033
See application file for complete search history.

(56) References Cited

U.S. PATENT DOCUMENTS 2,914,967 A * 12/1959 Simpson .................... F16H 3/66
                                                                    475/285
3,000,235 A *  9/1961 Simpson .................... F16H 3/66
                                                                    475/59

(Continued)

FOREIGN PATENT DOCUMENTS

DE        3638862 A1     6/1987
DE       29616952 U1     3/1998
(Continued)

OTHER PUBLICATIONS

Merriam-Webster, definition of "brake", Feb. 9, 2024, 1 page (Year: 2024).*

*Primary Examiner* — Ernesto A Suarez
*Assistant Examiner* — Lillian T Nguyen
(74) *Attorney, Agent, or Firm* — Husch Blackwell LLP

(57) ABSTRACT

A transmission for an agricultural or heavy load vehicle is provided, and includes a central drive shaft, at least one planetary gearset comprising a planet carrier, at least one output drive element, and one brake device. The drive shaft is connected to the output drive element via the planetary gearset. The brake device is located between the planet carrier and the output drive element in the form of a ring gear, such that the output drive element can be coupled to the planet carrier via the brake device.

17 Claims, 4 Drawing Sheets

(51) Int. Cl.
*F16H 1/28* (2006.01)
*F16H 57/02* (2012.01)
*F16H 63/34* (2006.01)

(52) U.S. Cl.
CPC ............... *F16H 2057/0206* (2013.01); *F16H 2200/0021* (2013.01); *F16H 2200/0034* (2013.01); *F16H 2200/2007* (2013.01); *F16H 2200/2033* (2013.01); *F16H 2200/2097* (2013.01)

(56) References Cited

U.S. PATENT DOCUMENTS

| | | | |
|---|---|---|---|
| 4,010,830 A | 3/1977 | Logus et al. | |
| 4,916,980 A * | 4/1990 | Asada | F16H 3/66 475/281 |
| 5,263,906 A * | 11/1993 | Antonov | F16D 25/123 475/330 |
| 6,090,006 A * | 7/2000 | Kingston | F16H 57/10 188/264 AA |
| 7,179,193 B2 * | 2/2007 | Kingston | B60K 17/046 180/372 |
| 9,638,310 B2 * | 5/2017 | Ziskovsky | F16H 57/02 |
| 2006/0111213 A1 * | 5/2006 | Bucknor | B60K 6/445 475/5 |
| 2006/0234821 A1 * | 10/2006 | Bucknor | B60K 6/365 475/5 |
| 2012/0202640 A1 * | 8/2012 | Morimoto | B60K 17/046 475/323 |
| 2015/0233467 A1 * | 8/2015 | Noerenberg | F16H 57/10 192/221.1 |
| 2017/0059003 A1 * | 3/2017 | Wagh | B62D 55/12 |
| 2017/0197613 A1 * | 7/2017 | Gv | B60K 6/365 |
| 2018/0112530 A1 * | 4/2018 | Fliearman | F01B 23/02 |
| 2019/0150352 A1 * | 5/2019 | Salzman | A01B 69/007 |
| 2021/0252959 A1 * | 8/2021 | Payne | F16H 48/24 |

FOREIGN PATENT DOCUMENTS

| | | | |
|---|---|---|---|
| DE | 60211202 T2 | 2/2007 | |
| DE | 202014001121 U1 | 6/2015 | |
| DE | 102016202726 A1 * | 8/2017 | F16H 3/46 |
| DE | 102018001508 B3 * | 5/2019 | B60K 1/00 |
| EP | 2910395 A2 | 8/2015 | |
| WO | WO-2012123170 A1 * | 9/2012 | B60K 6/365 |
| WO | 2014063729 A1 | 5/2014 | |

* cited by examiner

TRANSMISSION FOR A DRIVE TRAIN IN AN AGRICULTURAL OR HEAVY LOAD VEHICLE AND A CORRESPONDING DRIVE TRAIN AND CORRESPONDING VEHICLE

CROSS REFERENCE

This application claims priority to German Patent Application No. 20 2022 100214.2, filed Jan. 14, 2022, the entirety of which is hereby incorporated by reference.

FIELD OF THE INVENTION

The invention relates to a transmission for a drive train in an agricultural or heavy load vehicle, and a corresponding drive train and corresponding vehicle.

BACKGROUND OF THE INVENTION

An object hereof is known from U.S. Pat. No. 4,029,166. A sun gear in a planetary gearset is coupled in a form-fitting manner to a brake disc for a brake in the transmission described therein. The brake comprises a brake piston that forms the actuator. The brake piston can be controlled hydraulically such that the brake device in the form of a holding brake is released when pressure is applied. It is impossible to obtain a fixed operating brake with the increasingly greater vehicle sizes of agricultural vehicles and at vehicle speeds thereof ranging as high as 60 km/h.

BRIEF SUMMARY OF THE INVENTION

The object of the invention is therefore to improve the brake device in this type of brake system.

This problem is solved with a transmission of this type in which a brake device is placed between planet carriers and the output drive element in the form of a ring gear, such that the output drive element can be coupled to the planet carrier via the brake device. A brake device placed between the planet carrier and the ring gear can be large enough to absorb the energy in the brake device resulting from the greater sizes and speeds during a braking procedure. The position of the brake device between the planet carrier and the ring gear, and the gearing ratios or relative number of revolutions of the planet carrier and ring gear result in advantageous configurations of the brake and brake device. A brake device that is placed further away from the rotational axis of a drive shaft than in the prior art can be larger, such that it can also function as an operating brake. At the same time, the circumferential speeds occurring in the brake device are reduced due to the already existing gear ratio. It should be understood that the brake device can be designed as both a holding brake or operating brake, and as a holding and operating brake. Both holding and operating brakes shall also be referred to simply as brakes herein for purposes of simplicity.

It should also be understood that the placement between the planet carrier and output drive element forms a "drive-type" placement between the planet carrier and output drive element. This placement enables a more direct force flow between the planet carrier and output drive element, regardless of whether the brake device, or at least its parts that are absorbing the energy, is actually located between the planet carrier and the output drive element. This does, however, comprise a spatial placement "between" the planet carrier and output drive element, although this can also mean that it is placed adjacent to a planet carrier and/or the output drive element. In all of the configurations comprised in the invention, the brake device is coupled to the planet carrier in order to brake and/or secure the ring gear against the planet carrier.

The holding brake is designed in particular such that it actuates the brake in a position in which an associated actuating element is in an initial position or is not subjected to pressure. If the system intended for controlling the brake fails, braking therefore still takes place. The actuating element is subjected to a force in the initial position for this purpose.

The brake device preferably comprises a multiple disk brake, inner disks of which are non-rotatably connected to the planet carrier, and the out disks of which are connected to the output drive element for conjoint rotation therewith.

In combination with the positioning of the disks tightly against a ring gear, described above or below, the disk packet can efficiently absorb enough energy during an operating braking procedure to effectively stop the vehicle. The heat can be discharged through the brake fluid, or by the connection of the brake to the ring gear or planet carrier.

The advantageous effect of the brake is obtained in particular when the inner and outer disks are at a greater radial distance to the rotational axis of the drive shaft than the rotational axis of one of the planet gears in the planetary gearset.

In general, the typical and normal substantial elements of a planetary gearset are a sun gear, planet carrier and associated planet gears as well as a ring gear and the respective bearings in the framework of the invention. If there are numerous planetary gearsets, the brake device preferably couples the planet carrier in the first planetary gearset, seen from the direction of the input drive, to the ring gear, which represents a good compromise between the functioning as a holding brake and an operating brake. The brake device can also otherwise be located between the planet carrier in the second or another planetary gearset and the output drive element. In variants in which the planets in both the first and second planetary gearsets collectively apply a torque to the ring gear, the brake device is preferably located between the first planet carrier and the ring gear. The efficient gear ratio there makes it possible to make use of the existing structural space for the design of a multiple disk brake with an extremely high power range, which in turn reduces costs.

At least one of the disk carriers advantageously has at least one fluid channel with which the fluid level can be kept low enough during operation, while ensuring a good heat dissipation. This is particularly advantageous in variants of the transmission that make use of fluid circulation lubrication, without diminishing the operational efficacy of the brake.

The fluid channel for the at least one disk carrier, preferably the outermost in relation to the rotational axis, is fundamentally perpendicular to the extension of the frictional surface.

When in operation, lubrication results in a ring of fluid which has a fluid level of a few centimeters in an exemplary embodiment of the invention for an agricultural vehicle with respect to an outer inner surface of the housing or the ring gear for the transmission. Accordingly, there is an overflow at a distance to the central rotational axis of a drive shaft between the transmission flange and the ring gear. In relation to the planet carrier, this overflow is further away from the rotational axis of an input and drive shaft for the transmission. The overflow is basically at the level of the fluid channel for at least the outermost disk carrier, i.e. within a few centimeters (no more than ten), in this exemplary embodiment of the invention.

The transmission preferably has a fluid overflow at the other end of the ring gear, in particular at the level of the (inner and/or outer) disks in relation to preferably the outer disk carrier and therefore with respect to the position of the disk carrier, while an oil intake is located near the drive shaft, i.e. closer to the rotational axis of a drive shaft than the overflow. Near the drive shaft means, in particular, that the oil intake is no more than 10 cm from the rotational axis of the drive shaft.

A drive shaft is preferably a central shaft that is connected to a sun gear in the transmission for conjoint rotation therewith.

When the transmission or drive train is in operation, the disk carrier is located at one end of the ring gear with respect to a longitudinal central axis of the transmission, corresponding to a rotational axis for the drive shaft. A discharge for the fluid overflow is located on the other end of the ring gear along the rotational axis, in particular in the direction of a transmission flange with which the transmission can be connected to a vehicle or machine frame, such that the planetary gearset(s) can be lubricated starting from a central lubrication and transporting of the fluid over the first planetary gearset and the disk carrier to any other planetary gearsets. In particular, the fluid is conveyed from the motor end of the transmission either through or along the central drive shaft toward preferably an end of the transmission located at an outer surface of the associated machine.

In addition to an overflow for the operation, there is usually another overflow that regulates the fluid level when the transmission is not in operation. When the transmission is in operation, this overflow is closer to the rotational axis than the overflow for when the transmission is in operation, such that oil circulating through the transmission when in operation is then reduced to a maximum level when idle, if there is too much fluid in the transmission.

The brake device can be actuated hydraulically in particular. In order to actuate the brake device with pressure in particular, it advantageously comprises a central brake line that passes through the drive shaft, such that there is no need for an external brake line, which could easily become damaged, in particular in heavy load machines performing rough work. The brake device can also be supplied or actuated by means of an external brake line, resulting in a transmission with a simpler construction.

In one variant, in which the brake device is subjected to pressure by means of its brake line running through the center of the drive shaft, the transmission according to the invention contains an adapter with which a rotating passage is formed between the brake line and the actuating element in an advantageous embodiment. This adapter has a greater diameter at the actuating element end than at the drive shaft end. This results in an axial force toward the drive shaft, such that the adapter is secured in place. The adapter is preferably attached to the drive shaft with an O-ring seal, and a rotating seal is used at the side connected to the slowly rotating brake actuating element.

The axial length of the adapter is preferably at least twice its maximum transverse dimensions. In particular, the adapter is at least four times as long as it is wide. This results in lower angular errors in radial displacements, such that the gap between the adapter and the actuating element can be very small. This results in a longer service life for the seal, and acceptable PV values can still be maintained at pressures of preferably up to 30 bar and high rotational rates of up to 8,000 rpms. This results in an advantageous actuation or placement of the brake line through the drive shaft.

A ring gear in the transmission according to the invention has a cover on one side in another embodiment, in particular in the form of a lid. In particular, a spring-like actuator for the brake device, which preferably forms a return element, is braced against the inside of the cover. A return element or actuator can be a Belleville spring washer surrounding the rotational axis symmetrically. In an embodiment that has a removable lid on the ring gear, which can be screwed to the ring gear, for example, this cover is bowed outward toward the middle, i.e. preferably toward the side from a vertical central plane of the vehicle when in an operating position on a vehicle, in order to obtain enough stiffness to actuate the brake when combined with a Belleville spring washer that extends near the rotational axis further toward the input side of the transmission than at its radially outer end. The cover rotates along with the ring gear such that the part of a brake device on the side where the ring gear is can be readily supported.

In particular, the cover and parts of the brake device cannot rotate in relation to the ring gear, thus rotating conjointly therewith and not in relation to one another, and the ring gear is supported on a transmission flange, which enters the ring gear on the side opposite the cover. This makes it particularly easy to access the brake device for maintenance purposes.

The ring gear is also preferably supported on a fixed bearing on the transmission flange offset toward the cover, preferably in the form of a deep groove ball bearing, and with numerous planetary gearsets, the transmission flange is non-rotatably connected to the planet carriers in the second, or additional, planetary gearsets.

The transmission according to the invention is preferably designed as at least a two-speed planetary gearing, that has at least one second planetary gearset, which is located in front of the first planetary gearset when seen from the input side of the transmission. The input side of the transmission is the side where operating power is supplied to the preferably central drive shaft by an electric motor.

The other planetary gearsets can also be placed in front of the first planetary gearset, seen from the input side of the transmission. The brake device can then be ideally placed between a cover for the ring gear and the first planet carrier.

In particular, the sun gears in the second or any other additional planetary gearsets are placed on a hollow shaft, and in particular formed as part of this hollow shaft, with the hollow shaft encompassing the drive shaft. This results in a compact transmission, such that sufficient space is provided for the brake device.

The planet carrier on the last gearset is preferably non-rotatably connected to the transmission flange such that the ring gear can be supported in the manner described above.

In particular in combination with an electric or hydraulic motor, the transmission can form a multi-speed manual transmission, preferably a two-speed transmission, such that high rotational rates and correspondingly high speeds can be obtained with an associated drive train or vehicle. The brake device according to the invention is particularly advantageous when combined with an electric motor, which can also function in part as an operating brake.

The object of the invention specified in the introduction is also achieved with a drive train comprising a motor in the form of an hydraulic or electric motor in which the drive train contains a transmission described above or below.

A particularly compact design of the drive train is then obtained when a transmission flange is placed on the housing for the motor, and in particular is formed as an integral part thereof.

Lastly, the object of the invention specified in the introduction is also achieved with an agricultural or heavy load vehicle that has at least one, and in particular at least two, preferably at least four drive trains of the type described above or below. Such a vehicle can be a wheeled, tracked, and/or caterpillar vehicle with an acceptable overall weight of preferably up to 35 or 40 tons. This can also be a vehicle for use in fields or a rail vehicle.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Individual technical features of the exemplary embodiments described below can also be combined with exemplary embodiments described above and the features in the independent claims and any other claims for the subject matter of the invention. Whenever it makes sense, elements with the same function are given the same reference symbols.

Figure 1:
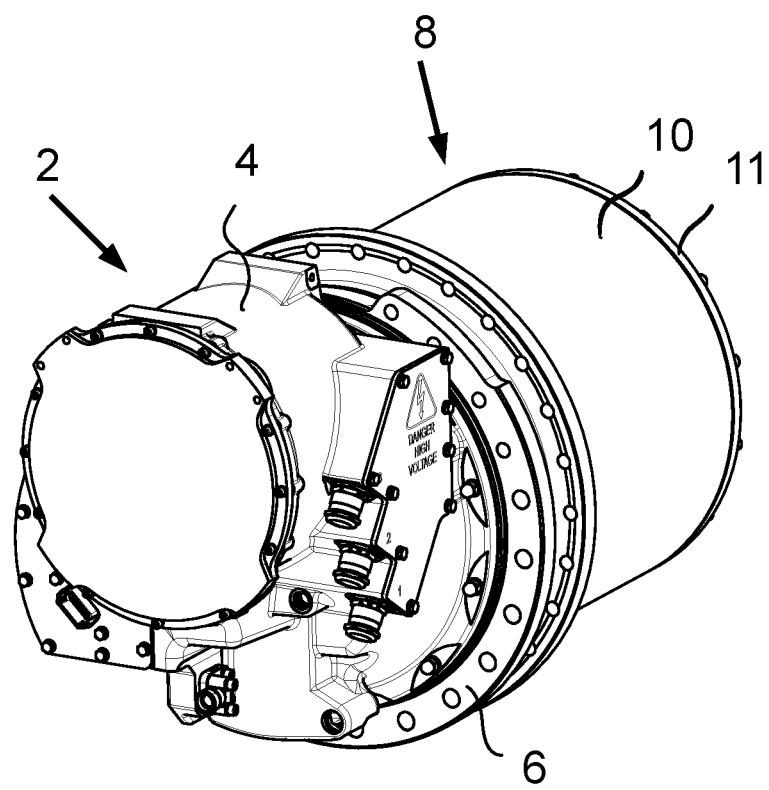
FIG. 1 shows a drive train according to the invention in a perspective view.

The drive train according to the invention has an electric motor 2 in a first exemplary embodiment, which is connected by its housing 4 to a transmission flange 6. This is part of a transmission 8 that has an output drive element in the form of a ring gear 10 (FIG. 1). The output drive element has a cover in the form of a lid 11 on one side, which is connected to the ring gear 10 for conjoint rotation.

Figure 4:
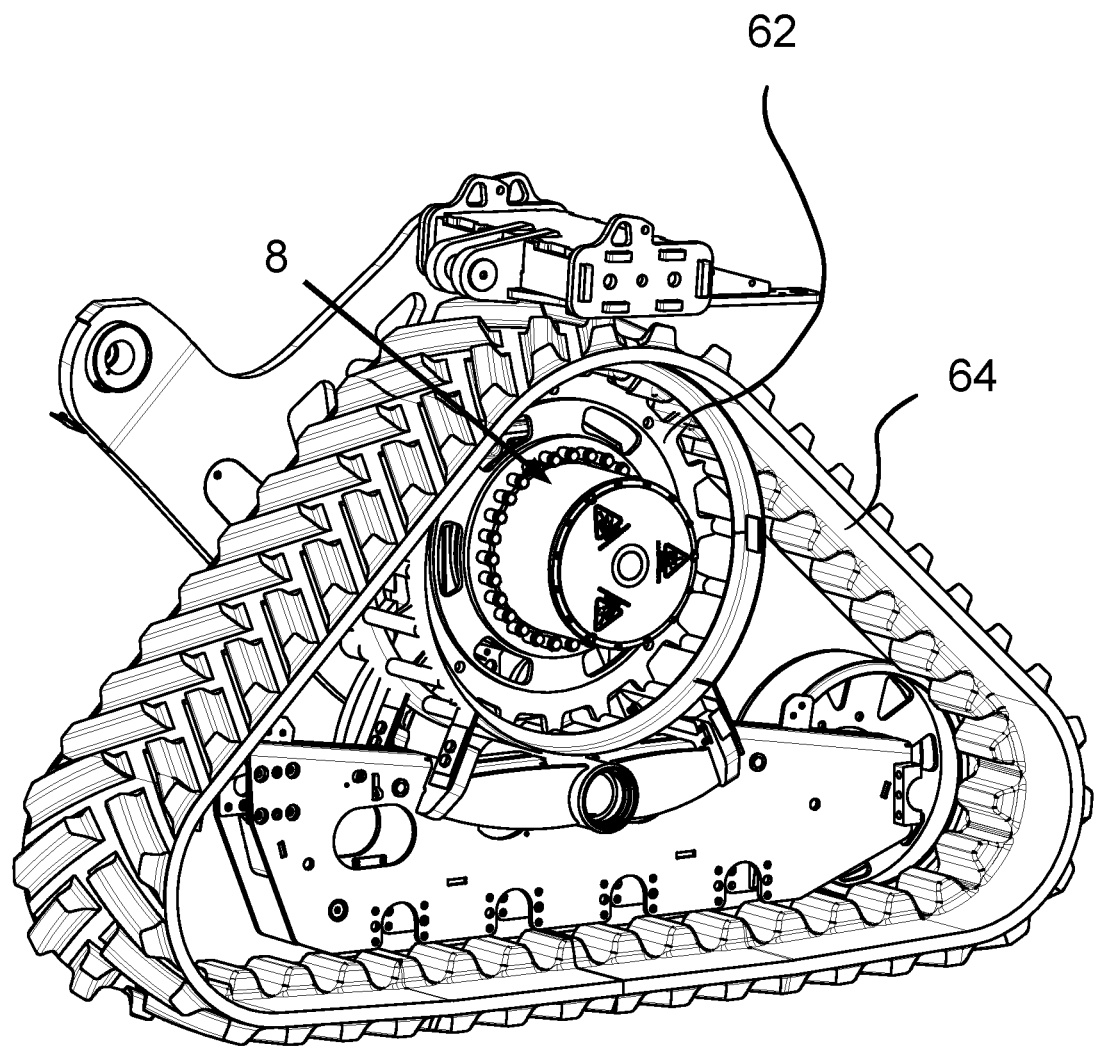
FIG. 4 shows a part of another vehicle according to the invention.

The drive flange in this example can be used in a construction such as that shown in FIG. 4, for example, and thus form part of a caterpillar vehicle.

Figure 2:
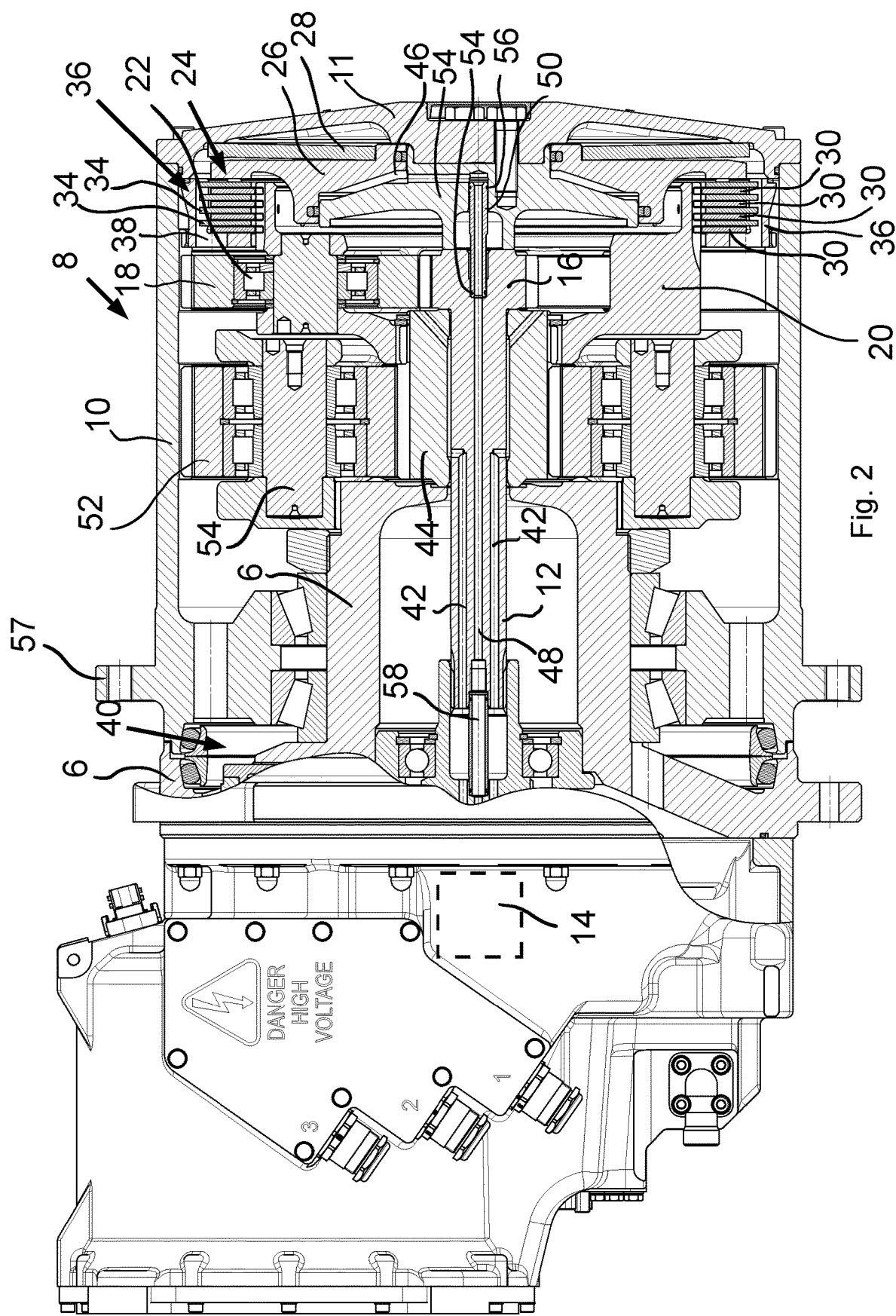
FIG. 2 shows a partially cutaway view of the drive train according to the invention.

The transmission 8 according to the invention forms a two-speed manual transmission in this example, in which a gear shift 14 upstream of the drive shaft 12 is simply indicated by box drawn with a broken line. This box is at the input side of the transmission 8. The manual transmission in the present example is a two-speed planetary gearing. The sun gear 16 meshes with the planet gears 18 in the first planetary gearset. The planet gears 18 are supported on a planet carrier 20 by bearings 22 (FIG. 2).

The brake device formed by a set of disks 24 is located between the planet carrier 20 and the ring gear 10 such that the output drive element (ring gear 10) can be coupled to the planet carrier 20. In the present case, the brake forms both an operating brake and a holding brake. In the position shown in the illustration, an actuating element 26 is pushed axially toward the drive and input side of the transmission, toward the left of the drawing, by a return element 28, such that when no pressure is applied to the brake device, the planetary gearing is blocked or stopped by the coupling of the planet carrier 20 to the ring gear 10. Inner disks 30 are located on a disk carrier for this that is formed by the planet carrier 20, while outer disks 34 are located on a disk carrier 36. The latter has a fluid channel 38, through which fluid between the disks can be removed during operation.

One region 40 forms an overflow for the fluid in the area between a flange (6) on the transmission and the ring gear 10.

The transmission is supplied with fluid via fluid channels 42 contained in the drive shaft 12 and a sun gear 44 in the second planetary gearset. This sun gear 44 is connected to the planet carrier 20 in the first planetary gearset for conjoint rotation. The fluid is thus supplied near the drive shaft.

The brake device, containing the disks 30 and 34, must absorb nearly all of the kinetic energy of the vehicle in the case of an emergency braking. This energy is absorbed by the material of the disk brake because very little fluid flows over the disks during the relatively short time span during which the emergency braking takes place. Because the disk packet is close to the ring gear, comprising the inner disks 30 and outer disks 34, the disk packets can contain a relatively high amount of material. The disk packet can preferably weigh 8 to 10 kg in an exemplary embodiment of the invention that is to be used in particular in a vehicle that is intended for use in fields.

The difference in the rotational rates of the planet carrier 20 compared to the rotational rate of the ring gear 10 can range from preferably 800 to 1,300 rpms. By way of example, with a maximum diameter of 40 cm (external) for the disk packet, comprising four inner and four outer disks, enough kinetic energy can be absorbed in vehicles that are moving at speeds of up to 40 km/h and weighing up to 40 tons with at least one transmission according to the invention, preferably two or four transmission and associated drive trains according to the invention.

The brake device is actuated by the application of pressure from a pressure chamber 46. The pressure is provided via a brake line 48 contained in the drive shaft 12. The brake line 48 is continued by an adapter 50 that forms a rotating passage. The adapter 50 is sealed against the drive shaft 12 with an O-ring seal 52. The adapter thus rotates in relation to the brake cylinder 54 and is connected thereto by a piston ring seal 56 located in a recess in the adapter 50.

There is a device, not shown, on the input side of the drive shaft 12, with which pressure is supplied to the brake line, thus actuating the brake.

The planet gears in the second planetary gearset are driven by the sun gear 44, which in turn mesh with the ring gear 10. A planet carrier 52 in the second planetary gearset is non-rotatably connected to the transmission flange 6.

The ring gear 10 forming the output drive element has a flange-like connecting region 57 with which a track chain, for example, can be driven. A connecting region 57 runs through a rotational axis 58 perpendicular thereto and through a bearing for the ring gear 10 such that the forces acting in the event of an emergency braking in particular can be absorbed effectively in the connecting region 57.

Figure 3:
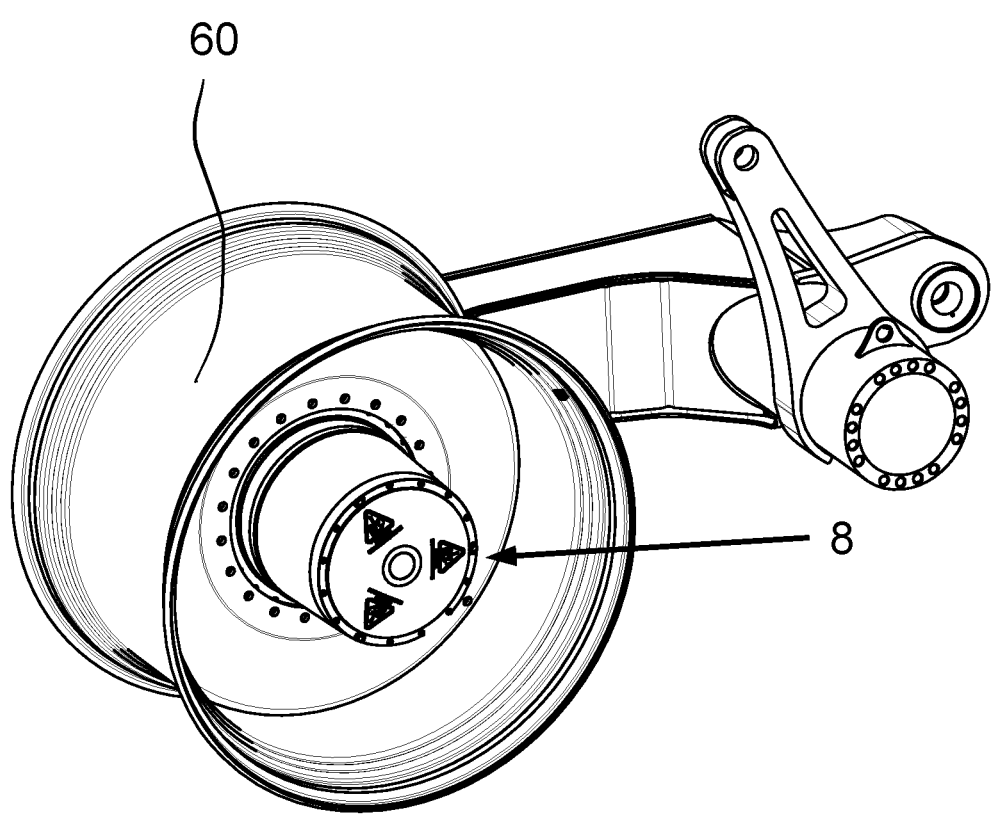
FIG. 3 shows a part of a vehicle according to the invention.

The transmission according to the invention can be part of a drive train for a wheeled vehicle that has a wheel carrier 60 that is powered via the ring gear (FIG. 3). Alternatively, the transmission can be used to power a drive wheel 62 in a particularly preferred embodiment, which drives a drive element in the form of a rubber track belt (or chain) 64. The drive train shown in FIG. 4 can have three essentially identical additional drive trains for driving a caterpillar vehicle used in particular for agricultural work.

The invention claimed is:

1. A transmission for a drive train in an agricultural or heavy load vehicle, the transmission comprising:
   a central drive shaft;
   a first planetary gearset including
      a first sun gear non-rotatably coupled to the central drive shaft,
      a first planet gear enmeshed with the first sun gear, and
      a first planet carrier rotatably engaged with the first planet gear;
   a second planetary gearset including
      a second sun gear non-rotatably coupled to the first planet carrier, and
      a second planet gear enmeshed with the second sun gear;
   an output drive element including a ring gear enmeshed with the second planet gear; and
   a brake device; located operatively between the first planet carrier and the output drive element, such that the output drive element is selectively fixedly couplable to the first planet carrier via the brake device,
   wherein the output drive element is selectively rotatable based on engagement of the output drive element with the first planet carrier via the brake device.

2. The transmission according to claim 1, wherein the brake device forms a holding and/or operating brake.

3. The transmission according to claim 1, wherein the brake device contains a multiple disk brake, inner disks of which are non-rotatably connected to the first planet carrier, and outer disks of which are connected to the output drive element for conjoint rotation.

4. The transmission according to claim 3, wherein the inner disks and the outer disks are at a greater radial distance to a first rotational axis of the drive shaft than to one or more of
   a second rotational axis of the first planet gear and
   a third rotational axis of the second planet gear.

5. The transmission according to claim 3, wherein the brake device has at least one fluid channel.

6. The transmission according to claim 5, wherein the output drive element defines a fluid overflow at an end opposite the brake device, and a fluid intake is located near the central drive shaft.

7. The transmission according to claim 1, wherein the brake device includes a brake line running through a center of the central drive shaft or connected externally, for actuating an actuating element of the brake device.

8. The transmission according to claim 7, wherein
   an adapter is located between the brake line and the actuating element, that
   the adapter bas actuating element end and a drive shaft end,
   the adapter forms a rotating passage, and
   the rotating passage has a greater diameter at the actuating element end than at the drive shaft end.

9. The transmission according to claim 1, wherein the output drive element has a cover at a first end.

10. The transmission according to claim 9, wherein
    the cover and a portion of the brake device are fixedly coupled to the output drive element, and
    the output drive element is supported on a transmission flange that enters the output drive element at a second end opposite the cover.

11. The transmission according to claim 1, wherein the second planetary gearset is located closer to an input side of the transmission than the first planetary gearset.

12. The transmission according to claim 11, wherein the second sun gear is located on a hollow shaft encompassing the central drive shaft.

13. The transmission according to claim 1, wherein a second planet carrier of the second planetary gearset is non-rotatably connected to a transmission flange.

14. The transmission according to claim 1, wherein the transmission is a manual transmission.

15. A drive train comprising a motor and the transmission according to claim 1.

16. The drive train according to claim 15, wherein a transmission flange is formed on a housing for the motor.

17. An agricultural or heavy load vehicle, comprising at least one drive train according to claim 15.

* * * * *